United States Patent Office 3,453,895
Patented July 8, 1969

3,453,895
GYROSCOPES
Norman John Myall, Watford, England, assignor of one-half to S. G. Brown Limited, Watford, England, a British company
Filed June 20, 1967, Ser. No. 647,550
Claims priority, application Great Britain, June 22, 1966, 27,802/66
Int. Cl. G01c *19/02, 19/54*
U.S. Cl. 74—5                    12 Claims

ABSTRACT OF THE DISCLOSURE

The disclosure relates to gyroscopes having a gyro rotor mounted for rotation by means permitting angular displacement of the rotor spin axis from the axis of the torque by which the rotor is caused to spin.

Figure 1:
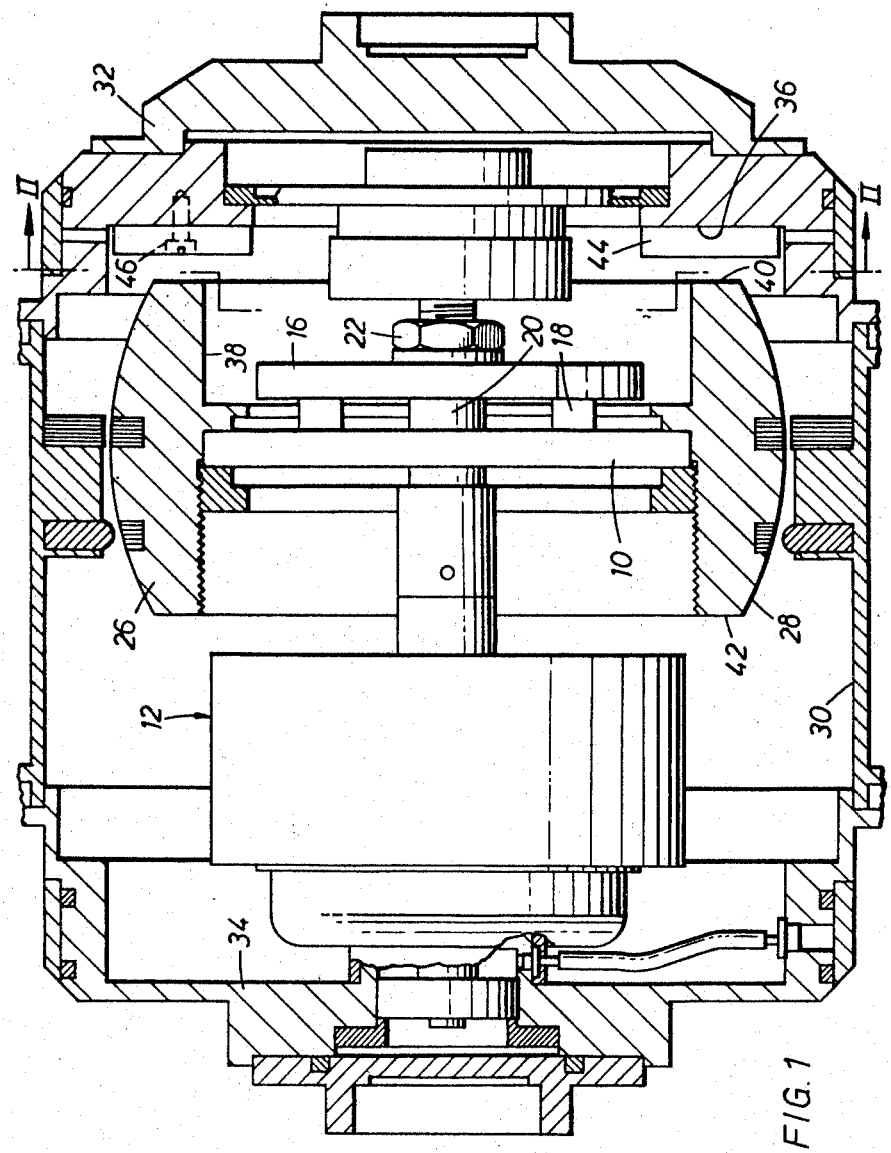

In accordance with the invention, the aerodynamic factors affecting the gyro are modified to influence its convergency time constant by promoting turbulence in the gaseous environment in which the rotor spins. Adjacent at least one surface of the rotor, which is not a spherical surface centred on the rotor suspension centre, a stationary surface is provided having portions inclined to the rotor surface. In the embodiment described, radially directed rectangular ribs are placed adjacent a rotor surface normal to its spin axis. The direction of the ribs can be adjusted. The arrangement described increases the convergency time constant and can be modified to cause divergency.

---

The invention relates to gyroscopes and in particular to gyroscopes having a gyro rotor mounted for rotation by means permitting angular displacement of the rotor spin axis from the axis of the torque for spinning the rotor.

Such a gyroscope may have the rotor mounted by any suitable suspension means which renders the rotor free or approximately free from torque constraints about any axis perpendicular to the polar axis of the rotor, the suspension means comprising for example a gimbal member connected to a drive shaft and to the rotor by two pairs of free hinges forming a Hooke's joint, or by two pairs of flexural spring pivots arranged on orthogonal axes. Examples of rotor assemblies employing spring pivots are disclosed in U.S. application Ser. Nos. 647,548 and 529,-751, and the recently filed continuation in part application based upon U.S. application Ser. No. 529,751. The behaviour of all such rotor assemblies is affected by aerodynamic factors, that is, by the reaction of the surrounding air or other gas on the movement of the quickly rotating rotor. In particular, aerodynamic factors affect the convergency time constant of the gyro, which is a measure of the time taken by the rotor spin axis to resume coincidence with the driving torque axis or shaft axis after an angular displacement therefrom has been imposed. The convergency is desirably long; it can be made so by operating the rotor in a vacuum but the manufacturing complications involved make an alternative means desirable. It is therefore the major object of the invention to provide means for influencing the convergency time constant of gyroscopes of the kind described.

The invention accordingly provides a gyroscope having a gyro rotor mounted for rotation in a gaseous environment by means permitting angular displacement of the rotor spin axis from the axis of the torque for rotating the rotor and stationary means adjacent the rotor arranged to promote the turbulence in the gaseous environment due to the rotation of the rotor.

The stationary means is arranged to react with the flow of air or other gas arising from surfaces of the rotor which are not spherical about the centre of the suspension of the rotor. Thus where the rotor has a surface at right angles to the spin axis and adjacent to a generally co-planar, but not necessarily exactly co-planar, non-rotating surface, for example, an end wall of the gyroscope casing, the invention can provide means such as radially or nearly radially extending ribs or deflectors on the non-rotating surface. Where the rotor has an external or internal cylindrical surface adjacent a coaxial or approximately coaxial stationary surface, such as the interior of the gyroscope casing, the invention can provide ribs or other projections on the non-rotating surface.

Figure 2:
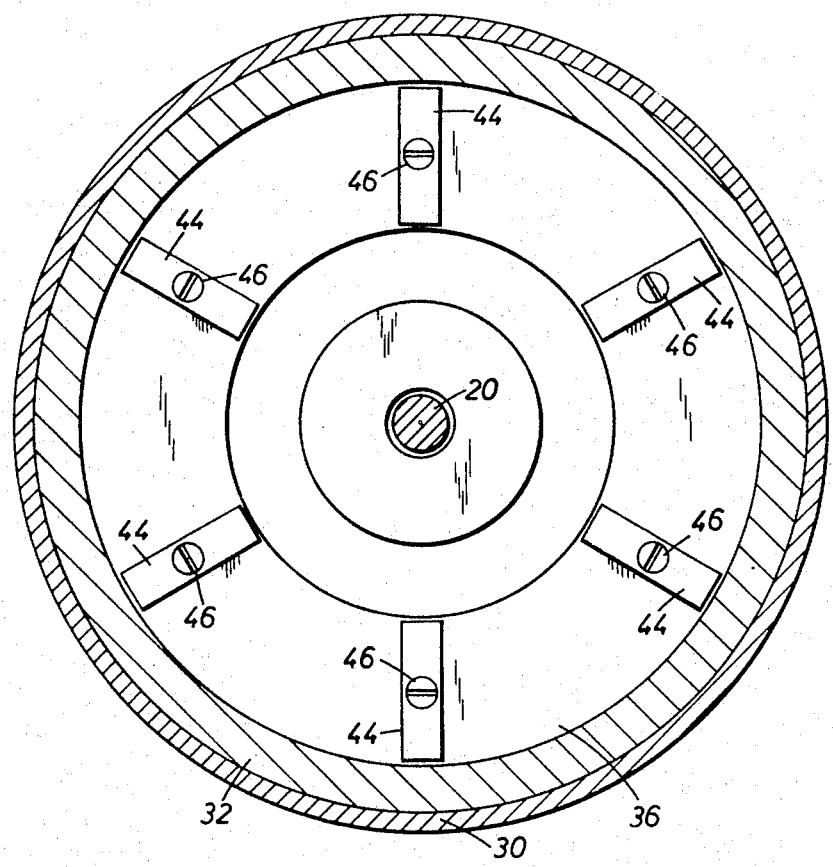

By way of example only, an embodiment of the invention is described below with reference to the accompanying drawings, in which:

FIGURE 1 is a sectional side view of a gyroscope having aerodynamic control means in accordance with the invention; and FIGURE 2 is an axial sectional view of the gyroscope of FIGURE 1 taken on the line II—II of FIGURE 1.

The gyroscope illustrated includes a gyro wheel suspension assembly constructed in accordance with the disclosure of U.S. application Ser. No. 647,548. The assembly thus comprises a metal disc 10 having an outer ring-like rotor portion separated by a slot from the disc interior. The interior is also divided into a central gimbal portion and a pair of spaced mounting portions between the gimbal and rotor portions, the mounting portions being rigidly connected to a diametrally extending bridge or yoke 16. The bridge 16 is axially spaced from the mounting portions by spacers 18 and is fixedly secured on a driving shaft 20 by a nut 22. The shaft 20 extends with clearance through a central aperture in the gimbal portion of the disc 10 to an electric motor 12 by which the rotor assembly can be rotated at a speed at which it is theoretically decoupled from its suspension.

Two pairs of flexural spring pivots on orthogonal axes connect the gimbal portion to the mounting portions and to the rotor portion to afford the gyro two degrees of freedom. Secured to the outer rotor portion of the disc 10 is a gyro wheel 26 which has the form of a short sleeve concentric with the shaft 20, the outer surface 28 of the wheel being spherical about the centre of suspension of the gyro. The assembly is housed within a generally cylindrical casing 30 with the shaft 20 extending axially. The gyroscope as shown includes both the pick-off arrangements of U.S. application Ser. No. 648,897 and magnetic torsional restraint means in accordance with U.S. application Ser. No. 648,897, these being of course optional features.

It will be seen that the gyro wheel 26 is much nearer one end wall 32 of the casing 30 than the other end wall 34, the space between the wheel and the other end wall being occupied by the electric motor 12 which is of lesser diameter than the gyro wheel 26.

In accordance with the invention, an annular portion 36 of the inner face of the casing end wall 32 adjacent the gyro wheel 26 is modified to influence the aerodynamic factors influencing the motion of the gyro wheel. Between its outer spherical surface 28 and its inner generally cylindrical surface 38, at which the connection is made to the rotor portion of the suspension assembly disc 10, the gyro wheel has a pair of annular end faces 40, 42 lying in spaced parallel planes at right angles to the rotor axis. On the portion 36 of the face of the end wall 32 opposite the gyro wheel end face 40, radially extending ribs 44 or "spoilers" are provided. It has been found that radially extending ribs as described substantially increase the convergency time constant of the gyroscope construction illustrated, that is, they reduce the rate of convergency.

The precise operation of the deflectors is not presently fully understood, but is thought to be due to the difference in the forces acting at diametrally opposed areas of the annular gyro wheel end face 40 when the rotor spin axis is tilted with respect to the drive shaft axis. It will be evident that such tilting cannot materially affect that part of the wheel surface which is spherical to the centre of suspension, because with the clearance and relative velocities typical in this class of gyroscope, the forces due to gas viscosity are so small as to have little or no effect, although those due to gas inertia are considerable.

The actual form and number of the spoilers can of course be varied according to the desired effect on the gyro wheel but a suitable arrangement has been found to consist of six ribs or bars of nearly rectangular cross-section arranged radially on the otherwise flat annular area. The radial length of the ribs is about three times the radial extent of the gyro wheel end face, beyond which the ribs extend about equally on either side. In the construction shown, the ribs are about 5/8 of an inch long, 1/8 of an inch deep axially on the gyro wheel and 3/16 of an inch wide. It has been found that spoiler ribs which are greater axially of the gyro wheel produce a reduction in convergency, as does an increase in the air gap between the gyro wheel end face and the spoiler ribs, from 0.28 of an inch in the construction shown. Reduction of the radial extent of the gyro wheel end face relative to the spoiler ribs, as by use of longer ribs, has the same effect.

The ribs are secured on the annular casing end face 36 by bolts 46 extending through central apertures in the ribs into tapped holes in the end wall. The effect of the ribs varies as each is turned about its securing bolt so that its longitudinal axis lies inclined to the radius passing through the centre of the rib. Inclination so as to divert the gas flow outwardly, that is, so that the outer ends of the ribs are advanced relative to the inner ends in the direction of the gyro wheel rotation, tends to decrease convergency, and inclination in the opposite direction has the contrary effect.

The effect of such changes can be sufficient to produce net divergence, so that angular displacement of the rotor spin axis increases.

It will be understood that the particular arrangement described is merely one that has been found suitable for use in an existing gyroscope. The same effects could be obtained by different windage deflection or turbulence promotion arrangements, for example, discs in place of the ribs 44, and in other gyroscope constructions quite different arrangements could be employed. The invention can therefore be embodied in a variety of ways other than as described without departing from its scope as defined in the following claims.

I claim:

1. A gyroscope having a gyro rotor mounted for rotation in a gaseous environment by means permitting angular displacement of the rotor spin axis from the axis about which the torque for spinning the rotor is applied and stationary means adjacent the rotor arranged to promote the turbulence in the gaseous environment due to rotation of the rotor.

2. A gyroscope as claimed in claim 1 in which the stationary means has surface portions adjacent at least one surface of the rotor which is not a spherical surface centred on the rotor suspension centre, the stationary surface portions being inclined to the adjacent rotor surface.

3. A gyroscope as claimed in claim 2 in which the stationary surface portions are inclined at right angles to the adjacent rotor surface in the undisplaced position of the rotor.

4. A gyroscope claimed in claim 2 in which the stationary surface has ridges providing the inclined surface portions.

5. A gyroscope as claimed in claim 4 in which the ridges extend transversely of the direction of movement of the adjacent rotor surface.

6. A gyroscope as claimed in claim 5 in which the rotor has an internal cylindrical surface and the stationary means comprises longitudinally extending ridges on a cylindrical surface adjacent the cylindrical rotor surface.

7. A gyroscope as claimed in claim 5 in which the rotor has a surface at right angles to the spin axis thereof and the stationary means comprises ridges extending radially or generally radially of the torque axis.

8. A gyroscope as claimed in claim 7 having a plurality of equally spaced ribs constituting the ridges, the ribs being secured to an inner surface of an end wall of a generally cylindrical casing containing the gyroscope.

9. A gyrscope as claimed in claim 8 in which the ribs are of constant approximately rectangular cross-section.

10. A gyroscope as claimed in claim 9 in which the ribs have a lesser dimension axially of the casing than in a driection at right angles thereto.

11. A gyroscope as claimed in claim 8 in which the ribs are each mounted on the surface for adjustment about an axis parallel to the driving shaft axis.

12. A gyroscope as claimed in claim 8 in which the rotor surface is an annular surface and the ribs extend approximately equal distances radially inwardly and outwardly beyond the rotor surface in the undisplaced position of the rotor.

References Cited

UNITED STATES PATENTS 2,173,228  9/1939  Dearing _____ 74—5.43
3,354,726  11/1967  Krupick et al. _____ 74—5.6

FRED C. MATTERN, JR., *Primary Examiner.*

F. D. SHOEMAKER, *Assistant Examiner.*

U.S. Cl. X.R.
74—5.4